United States Patent
Kim et al.

(10) Patent No.: US 9,481,269 B2
(45) Date of Patent: Nov. 1, 2016

(54) RECLINER FOR VEHICLE SEAT

(71) Applicant: DAS CO., LTD., Gyeongju-si, Gyeongsangbuk-do (KR)

(72) Inventors: Sung-Chul Kim, Gyeongju-si (KR); Jae-Ho Kim, Gyeongju-si (KR)

(73) Assignee: DAS CO., LTD., Gyeongju-si, Gyeongsangbuk-do (KR)

( * ) Notice: Subject to any disclaimer, the term of this patent is extended or adjusted under 35 U.S.C. 154(b) by 351 days.

(21) Appl. No.: 14/374,024

(22) PCT Filed: Jun. 26, 2014

(86) PCT No.: PCT/KR2014/005720
§ 371 (c)(1),
(2) Date: Jul. 23, 2014

(87) PCT Pub. No.: WO2014/209048
PCT Pub. Date: Dec. 31, 2014

(65) Prior Publication Data
US 2016/0272089 A1    Sep. 22, 2016

(30) Foreign Application Priority Data
Jun. 27, 2013 (KR) .................. 10-2013-0074567

(51) Int. Cl.
  *B60N 2/22* (2006.01)
  *B60N 2/225* (2006.01)
(52) U.S. Cl.
  CPC .................. *B60N 2/2252* (2013.01)
(58) Field of Classification Search
  CPC .................................... B60N 2/2252
  USPC ........................... 297/367 R, 367 P
  See application file for complete search history.

(56) References Cited

U.S. PATENT DOCUMENTS

| 7,314,250 B1* | 1/2008 | Eblenkamp | B60N 2/2252 297/367 R |
| 8,915,548 B2* | 12/2014 | Stilleke | B60N 2/2252 297/361.1 |

FOREIGN PATENT DOCUMENTS

| CN | 101778734 A | 7/2010 |
| CN | 102481862 A | 5/2012 |
| KR | 20050094342 A | 9/2005 |
| KR | 20120049333 A | 5/2012 |

OTHER PUBLICATIONS

Korean Office Action, corresponding to Korean Application No. KR2014005720, filed Jun. 28, 2014 (in Korean language only).

* cited by examiner

*Primary Examiner* — Anthony D Barfield

(57) ABSTRACT

Disclosed herein is a recliner for a vehicle seat including an external gear bracket having an external gear, an internal gear bracket which has an internal gear and is formed with a central protrusion, a socket which is formed with a socket protrusion and has an operation protrusion, and a pair of wedge blocks configured to surround the central protrusion. The socket includes a lubrication pocket for supplying a lubricating substance to the central protrusion of the internal gear bracket or the bush, and thus may improve durability of each component by constantly supplying the lubricating substance between the central protrusion of the internal gear bracket and the operation protrusion of the socket, between the operation protrusion of the socket and the bush, and between the bush and the wedge blocks.

6 Claims, 4 Drawing Sheets

RECLINER FOR VEHICLE SEAT

CROSS-REFERENCE(S) TO RELATED APPLICATIONS

This application is a U.S. National Phase Application of PCT/KR2014/005720, filed on Jun. 26, 2014, which claims priority to Korean Patent Application No. 10-2013-0074567 filed on Jun. 27, 2013, the disclosures of which are incorporated herein by reference in their entirety.

BACKGROUND OF THE INVENTION

1. Field of the Invention

Exemplary embodiments of the present invention relate to a recliner for a vehicle seat, and more particularly, to a recliner for a vehicle seat capable of maintaining lubrication action by configuring a lubricating oil supply portion capable of supplying a lubricating substance to any one of respective contact surfaces between a socket, a bush, wedge blocks, and a cam sleeve which are operatively pressed against each other.

2. Description of the Related Art

In general, a vehicle is equipped with a seat back, which is pivotable relative to a seat cushion by forming the seat back as a hinge structure, and a recliner allowing the seat back to be mutually switched from a locked state of being fixed to the seat cushion at a certain angle to an unlocked state of being pivotable relative to the seat cushion. That is, a passenger may adjust an angle of the seat back according to the body form or convenience thereof by operation of the recliner.

Such recliners are classified into a lever type recliner in which, when an operation lever is operated, a recliner is unlocked so that a seat back is pushed by a passenger's back to adjust an angle of the seat back, and a rotary type recliner which adjusts an angle of a seat back by turning an operation knob in the form of a dial.

Among the recliners, the rotary type recliner is disclosed in Japanese Patent Laid-Open Publication No. 2010-253101 (Patent Document 1). FIG. 1 shows an example of a conventional rotary type recliner.

As shown in the drawing, a conventional recliner 10 includes a shaft 11, an external gear bracket 12, an internal gear bracket 13, a socket 14, a bush 15, a plate cover 16, a guide ring 17, and a power transmission unit 20.

The external gear bracket 12 is formed, at a center thereof, with a fitting hole 12a, while being formed, at an inside surface thereof, with an external gear 12b.

The internal gear bracket 13 is formed, at a center thereof, with a central protrusion 13a protruding therefrom, while being formed, at a circumferential surface thereof, with an internal gear 13b which selectively engages with the external gear 12b. The internal gear 13b has the number of gear teeth less than the number of those of the external gear 12b.

The socket 14 is formed, at a center thereof, with a coupling hole 14a through which the shaft 11 passes so that the shaft 11 is spline-coupled to the socket 14. The socket 14 is formed, at one side surface thereof, with a socket protrusion 14b protruding therefrom so that the socket protrusion 14b is inserted into the central protrusion 13a of the internal bracket 13. The socket 14 is provided with a spring protrusion 14d protruding in a direction opposite to the socket protrusion 14b.

The bush 15 is fitted and coupled to the fitting hole 12a of the external gear bracket 12.

The power transmission unit 20 rotates the external gear bracket 12 relative to the internal gear bracket 13. The power transmission unit 20 includes a cam sleeve 22 surrounding a portion of an outer peripheral surface of the central protrusion 13a, a pair of wedge blocks 21 provided between the cam sleeve 22 and the bush 15, and a wedge spring 23 which is fitted and installed between the pair of wedge blocks 21 by bending both ends of the wedge spring 23 so as to apply force for outwardly spreading the wedge blocks 21.

The cam sleeve 22 has a semicircular shape and is configured such that an inner peripheral surface thereof surrounds a portion of the outer peripheral surface of the central protrusion 13a.

The pair of wedge blocks 21 is configured to face each other and to be spaced apart from each other at one end portions thereof. The other end portions of the wedge blocks 21 are configured to be bent and press an end portion of the cam sleeve 22 during operation of the recliner.

The plate cover 16 encloses one surface (a front surface in FIG. 1) of the external gear bracket 12 so as to prevent decoupling of the socket 14 and the power transmission unit 20 therefrom.

The guide ring 17 surrounds the external gear bracket 12, the internal gear bracket 13, and an outer peripheral surface of the plate cover 16 so that they are integrally coupled.

In the conventional recliner 10, the shaft 11 is rotated by actuation force of a lever or a motor and the socket 14 coupled to the shaft 14 is also rotated. In this case, the socket 14 rotates the cam sleeve 22 together with the wedge blocks 21, and the rotation of the wedge blocks 21 causes a change in position of an engagement section due to a difference of the number of gear teeth between the external gear 12b and the internal gear 13b. Accordingly, an angle of a seat back is adjusted by the change in position of the engagement section.

However, operation of the conventional recliner 10 applies a load to an inner peripheral surface of the bush 15 and the outer peripheral surface of the central protrusion 13a of the internal gear bracket 13 coming into contact with the cam sleeve 22 and the wedge blocks 21 rotated by the socket 14 during the operation of the conventional recliner 10.

In this case, there is a problem in that noise is generated since actuation force is increased due to an increase of friction force between the outer peripheral surface of the central protrusion 13a and the cam sleeve 22 and between the inner peripheral surface of the bush 15 and the wedge blocks 21.

In addition, there is a problem in that durability of the recliner is deteriorated since the outer peripheral surface of the central protrusion 13a and the inner peripheral surface of the bush 15 are worn out by friction force generated between the outer peripheral surface of the central protrusion 13a and the cam sleeve 22 and between the inner peripheral surface of the bush 15 and the wedge blocks 21.

[Patent Document 1] Japanese Patent Laid-Open Publication No. 2010-253101

SUMMARY OF THE INVENTION

An object of the present invention is to provide a recliner for a vehicle seat capable of continuously supplying a lubricating substance between an outer peripheral surface of a central protrusion and wedge blocks and between an inner peripheral surface of a bush and a cam, so as to reduce friction force caused during operation of the recliner.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a recliner for a vehicle seat includes an external gear bracket formed with a through-hole to which a bush is fitted and coupled, the external gear bracket having an external gear, an internal gear bracket which has an internal gear corresponding to the external gear and is formed with a central protrusion protruding toward the external gear bracket, the central protrusion having a fitting hole through which a shaft passes, a socket formed with a socket protrusion having a coupling hole through which the shaft is spline-coupled to the socket, the socket protrusion is formed toward the internal gear bracket, the socket having an operation protrusion which protrudes to surround a portion of an outer peripheral surface of the central protrusion, and a pair of wedge blocks configured to surround a portion of the outer peripheral surface of the central protrusion in a state in which one end portions of the wedge blocks face each other, wherein a first lubrication pocket is provided on an inner peripheral surface of the operation protrusion so as to supply a lubricating substance to the outer peripheral surface of the central protrusion.

In addition, the first lubrication pocket may include a plurality of oil grooves spaced apart from each other at regular intervals on the inner peripheral surface of the operation protrusion.

In addition, a second lubrication pocket may be provided on an outer peripheral surface of the operation protrusion so as to supply the lubricating substance to an inner peripheral surface of the bush.

In addition, the second lubrication pocket may include a plurality of oil grooves spaced apart from each other at regular intervals on the outer peripheral surface of the operation protrusion.

In addition, a third lubrication pocket may be provided on one side surface of the socket formed with the socket protrusion protruding therefrom so as to supply the lubricating substance to inner peripheral surfaces of the pair of wedge blocks.

The recliner may further include a cam sleeve disposed between the inner peripheral surfaces of the pair of wedge blocks and the outer peripheral surface of the central protrusion, and the third lubrication pocket may include a plurality of oil grooves through which the lubricating substance is supplied between the inner peripheral surfaces of the pair of wedge blocks and the outer peripheral surface of the cam sleeve.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Figure 1:
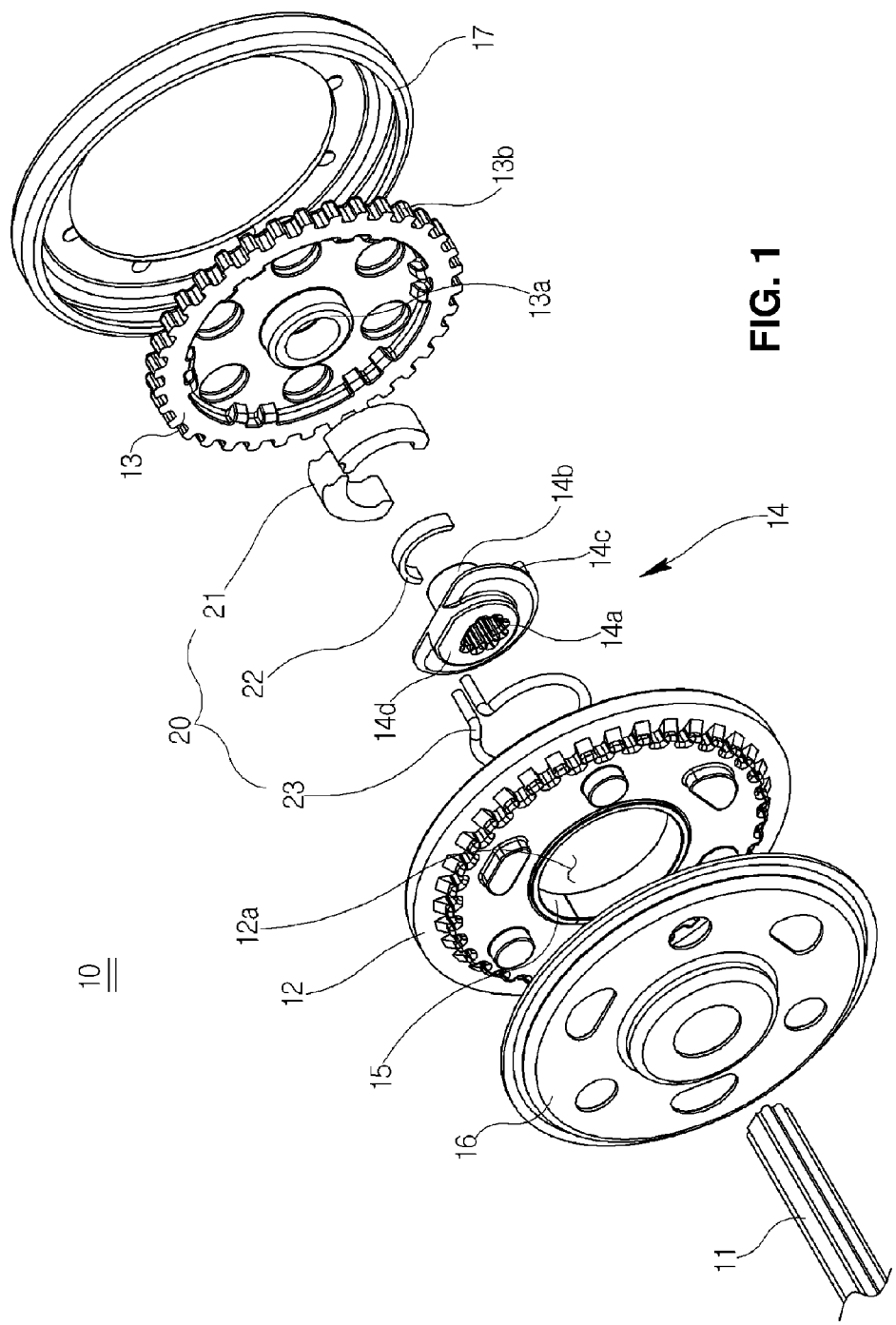
FIG. 1 is an exploded perspective view illustrating a conventional recliner for a vehicle seat.

Exemplary embodiments of the present invention will be described below in more detail with reference to the accompanying drawings. In addition, the thickness of each line or the size of each component illustrated in the drawings may be exaggerated for convenience of description and clarity. Moreover, terms to be described later are terms defined in consideration of functions of the present invention, and these may vary with the intention or practice of a user or an operator. Therefore, such terms should be defined based on the entire content disclosed herein.

Figure 2:
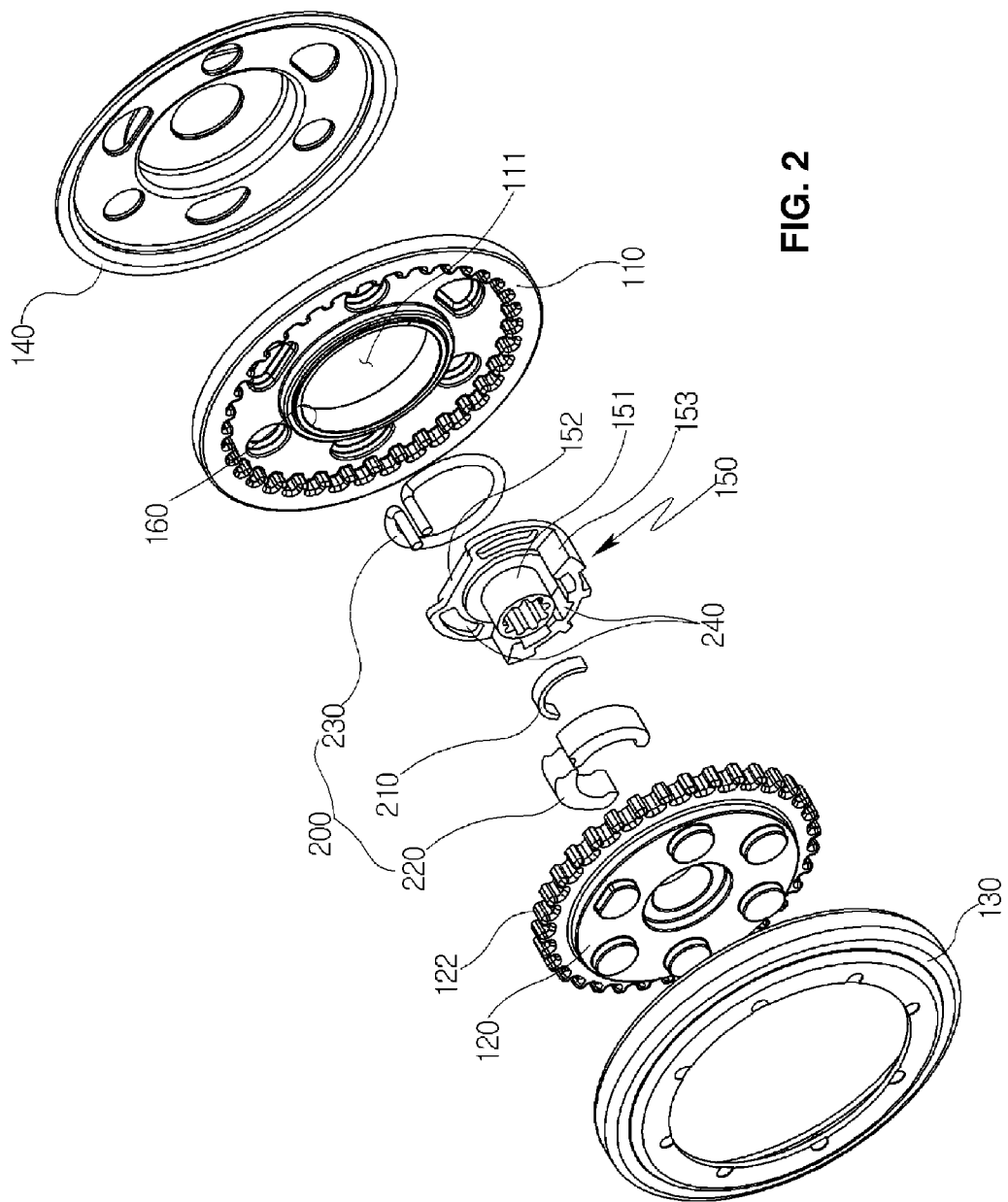
FIG. 2 is an exploded perspective view illustrating a recliner for a vehicle seat according to an embodiment of the present invention.
Figure 3:
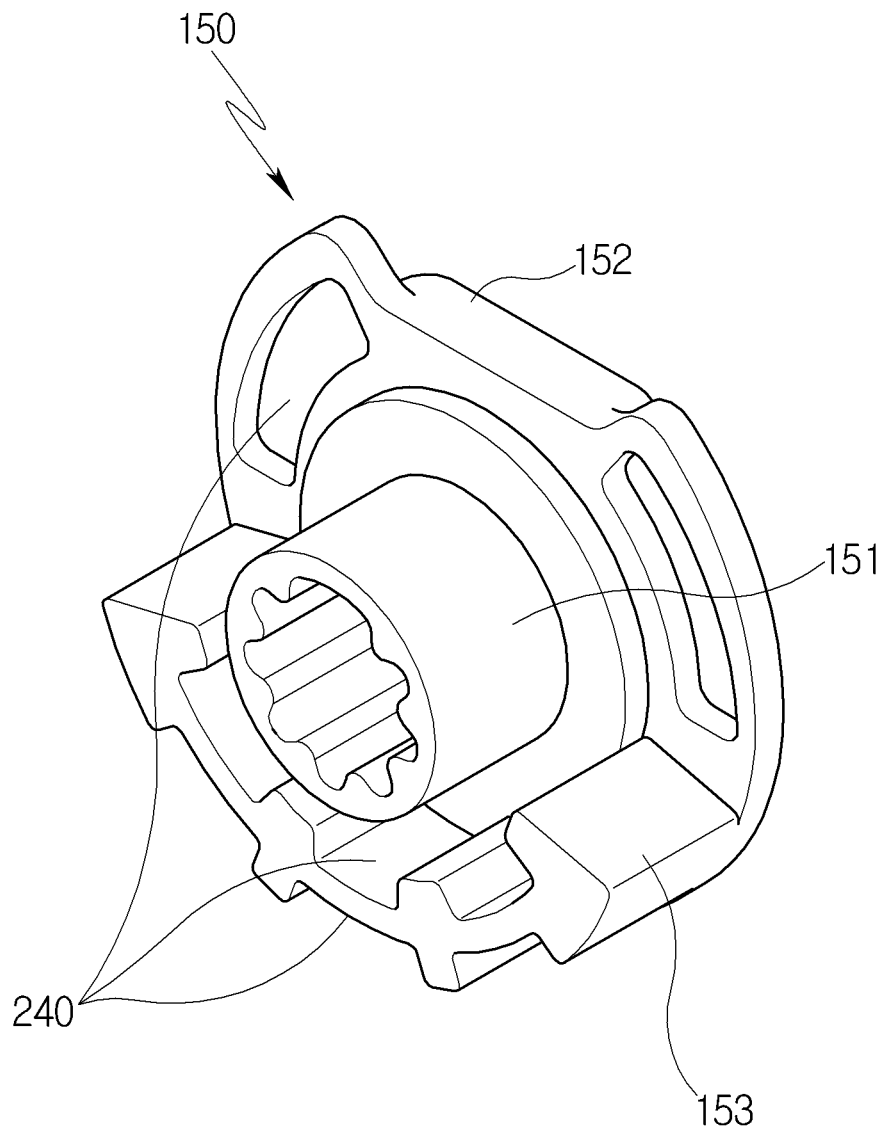
FIG. 3 is a perspective view illustrating a socket in the recliner of FIG. 2.
Figure 4:
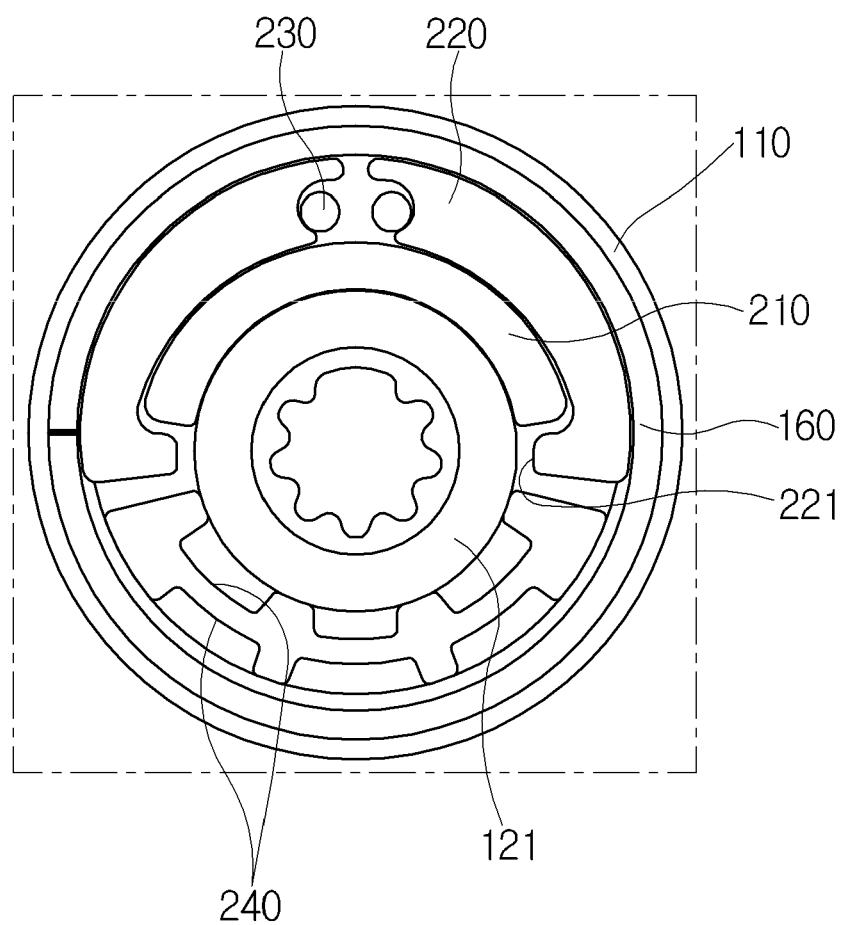
FIG. 4 is a planar cross-sectional view illustrating a coupled state of a socket, a cam, a central protrusion, and a bush in the recliner of FIG. 2.

FIG. 2 is an exploded perspective view illustrating a recliner for a vehicle seat according to an embodiment of the present invention. FIG. 3 is a perspective view illustrating a socket in the recliner of FIG. 2. FIG. 4 is a planar cross-sectional view illustrating a coupled state of a socket, a cam, a central protrusion, and a bush in the recliner of FIG. 2.

As shown in the drawings, a recliner for a vehicle seat 100 according to an embodiment of the present invention includes a shaft, an external gear bracket 110, an internal gear bracket 120, a guide ring 130, a plate cover 140, a socket 150, a bush 160, and a power transmission unit 200. The power transmission unit 200 includes a cam sleeve 210, wedge blocks 220, a wedge spring 230, and a lubrication pocket 240.

The shaft couples a back frame (not shown), which is coupled with a seat back, to a cushion frame (not shown), which is coupled with a seat cushion, and supports the back frame such that the back frame is rotatable relative to the cushion frame.

Each of both ends of the shaft is provided with the recliner 100 and an operation means is provided outside the recliner 100. Here, the operation means may be configured of a motor capable of rotating the shaft or be configured of an operation knob in the form of a dial capable of being turned by an operator's hand.

The external gear bracket 110 is coupled to the back frame and is formed, at a center thereof, with a through-hole 111 to which the shaft is fitted. An external gear 112 has a plurality of gear teeth continuously formed on an inside surface of the external gear bracket 110 along a circumferential direction thereof.

The internal gear bracket 120 is coupled to the cushion frame, and is formed, at a center thereof, with a central protrusion 121 protruding toward the external gear bracket 110. The central protrusion 121 of the internal gear bracket 120 is formed with a fitting hole to which a socket protrusion 151 of the socket 150 to be described later is fitted.

An internal gear 122, which selectively engages with the external gear 112, is continuously formed on an outer peripheral surface of the internal gear bracket 120 along a circumferential direction thereof. The internal gear 122 has the number of gear teeth less than the number of those of the external gear 112.

The central protrusion 121 of the internal gear 122 has a pipe shape such that the shaft is fitted to and passes through the central protrusion 121.

Meanwhile, the present invention may also be configured such that the internal gear bracket 120 is coupled to the back frame and the external gear bracket 110 is coupled to the cushion frame.

The socket 150 is formed, at a center thereof, with a coupling hole through which the shaft is spline-coupled to the socket 150. An edge of the coupling hole of the socket 150 is formed with a socket protrusion 151 protruding from one side surface of the socket 150 such that the socket protrusion 151 is fitted to the fitting hole of the internal gear bracket 120. That is, the socket protrusion 151 protrudes toward the internal gear bracket 120 from a center of one side surface of the socket 150, and the shaft passes through the socket protrusion 151 to be spline-coupled to the socket 150 through the coupling hole formed thereon. The other side surface of the socket 150 is formed with a spring protrusion 152 directed toward the external gear bracket 110.

The socket 150 is formed with an operation protrusion 153 protruding therefrom such that the operation protrusion 153 partially surrounds an outer peripheral surface of the central protrusion 121 formed at the internal gear bracket 120 and presses the wedge blocks 220 to be described later.

The bush 160 is made of a metal material and is fitted and coupled to the through-hole 111 of the external gear bracket 110.

The plate cover 140 encloses one surface (a rear surface in FIG. 2) of the external gear bracket 110 so as to prevent decoupling of the socket 150, the bush 160, and the power transmission unit 200 therefrom.

The guide ring 130 surrounds the external gear bracket 110 and an outer peripheral surface of the internal gear bracket 120 so that they are integrally coupled.

The power transmission unit 200 transmits torque generated by the operation means coupled to the shaft to the external gear bracket 110 via the internal gear bracket 120. The power transmission unit 200 includes a cam sleeve 210, a pair of wedge blocks 220, and a wedge spring 230.

The cam sleeve 210 has a circular arc shape so as to surround a portion of the outer peripheral surface of the central protrusion 121 of the internal gear bracket 120. The cam sleeve 210 is configured such that a uniform gap is formed between both end portions of the cam sleeve 210 and both end portions of the wedge blocks 220 to be described later.

The pair of wedge blocks 220 is provided between the internal gear bracket 120 and the socket 150. The pair of wedge blocks 220 surrounds the outer peripheral surface of the central protrusion 121 of the internal gear bracket 120. That is, the pair of wedge blocks 220 wholly surrounds the outer peripheral surface of the central protrusion 121 of the internal gear bracket 120, together with the operation protrusion 153 of the socket 150.

Each of the wedge blocks 220 has one-fourth circular arc shape. The pair of wedge blocks 220 is installed to face each other and has a shape in which a width is narrowed from one end portions adjacent to each other to the other end portions. The pair of wedge blocks 220 is supported in such a way that a bent end portion of the wedge spring 230 to be described later is fitted between one end portions of the wedge blocks 220 adjacent to each other. The other end portions of the pair of wedge blocks 220 are respectively supported by both end portions of the operation protrusion 153 of the socket 150.

The cam sleeve 210 having a circular arc shape is provided between the pair of wedge blocks 220 and the central protrusion 121 of the internal gear bracket 120. The cam sleeve 210 comes into contact with each of the outer peripheral surface of the central protrusion 121 of the internal gear bracket 120 and inner peripheral surfaces of the pair of wedge blocks 220.

The other end portions of the pair of wedge blocks 220 are respectively provided with pressing protrusions 221 which are bent toward the central protrusion 121 of the internal gear bracket 120. Accordingly, the pressing protrusions 221, which are respectively provided at the pair of wedge blocks 220, alternately press both end portions of the cam sleeve 210.

The wedge spring 230 has a circular shape so as to be fitted to the spring protrusion 152 of the socket 150 to be supported by the other side surface of the socket 150. Both end portions of the wedge spring 230 are bent toward the internal gear bracket 120 in an adjacent state of facing each other. Accordingly, both end portions of the wedge spring 230 are fitted between one end portions of the pair of wedge blocks 220 adjacent to each other so as to elastically push the respective wedge blocks 220.

In this case, one end portion of each of the pair of wedge blocks 220 is elastically supported by the wedge spring 230 and the other end portion thereof is supported by the operation protrusion 153 of the socket 150. One end portions of the pair of wedge blocks 220 are formed with catching grooves 221 so that both end portions of the wedge spring 230 are fitted to and caught by the catching grooves 221.

Meanwhile, the socket 150 further includes a lubrication pocket 240 which receives a lubricating substance to supply the lubricating substance to the outer peripheral surface of the central protrusion 121 of the internal gear bracket 120 or an inner peripheral surface of the bush 160 and to perform lubrication action between the wedge blocks 220, the cam sleeve 210, and the operation protrusion 153 of the socket 150.

Specifically, the lubrication pocket 240 includes a first lubrication pocket provided on an inner peripheral surface of the operation protrusion 151 so as to supply the lubricating substance to the outer peripheral surface of the central protrusion 121, a second lubrication pocket provided on an outer peripheral surface of the operation protrusion 151 so as to supply the lubricating substance to the inner peripheral surface of the bush 160, and a third lubrication pocket provided on one side surface of the socket 150 formed with the socket protrusion 151 protruding therefrom so as to supply the lubricating substance to the inner peripheral surfaces of the pair of wedge blocks 220.

The lubrication pockets 240 are configured of at least one or more oil grooves which are formed on one side surface of the socket 150 formed with the socket protrusion 151 protruding therefrom, the inner peripheral surface of the operation protrusion 153, and the outer peripheral surface of the operation protrusion 153. The first lubrication pocket is formed as a plurality of oil grooves spaced apart from each other at regular intervals on the inner peripheral surface of the operation protrusion 153. The second lubrication pocket is formed as a plurality of oil grooves spaced apart from each other at regular intervals on the outer peripheral surface of the operation protrusion 153. The third lubrication pocket is formed as a plurality of oil grooves through which the lubricating substance is supplied between the inner peripheral surfaces of the pair of wedge blocks 220 and an outer peripheral surface of the cam sleeve 210.

The oil grooves of the first lubrication pocket formed on the inner peripheral surface of the operation protrusion 153 are formed toward an outer peripheral surface of the socket protrusion 151. The lubricating substance in the oil grooves is supplied to the outer peripheral surface of the socket protrusion 151 so as to reduce friction force generated between the outer peripheral surface of the socket protrusion 151, the inner peripheral surface of the cam sleeve 210, and the inner peripheral surface of the operation protrusion 153.

The oil grooves of the second lubrication pocket formed on the outer peripheral surface of the operation protrusion 153 are formed toward the inner peripheral surface of the bush 160. The oil grooves formed on the outer peripheral surface of the operation protrusion 153 reduce friction force generated between the inner peripheral surface of the bush 160 and the outer peripheral surface of the operation protrusion 153 and between the inner peripheral surface of the bush 160 and the outer peripheral surfaces of the wedge blocks 220.

The oil grooves of the third lubrication pocket formed on one side surface of the socket 150 are preferably formed across a section in which the inner peripheral surfaces of the wedge blocks 220 are pressed against the outer peripheral surface of the cam sleeve 210 such that the lubricating substance may be supplied between the inner peripheral surfaces of the pair of wedge blocks 220 and the outer peripheral surface of the cam sleeve 210.

Hereinafter, operation of the recliner according to the embodiment of the present invention having the above-mentioned configurations will be simply described.

Here, the recliner 100 according to the embodiment of the present invention is provided in the seat. The recliner 100 is operated in such a way that a passenger directly turns an operation dial coupled to the shaft coupled to the socket, or is operated by driving of a motor connected with the shaft when an operation button for driving the motor is provided in the seat to be pushed by a passenger.

First, when the recliner 100 is locked, the pair of wedge blocks 220 is applied to be spread outward by elastic force of the wedge spring 230. Consequently, each of the inner peripheral surfaces of the pair of wedge blocks 220 is maintained in a state of coming into contact with the outer peripheral surface of the cam sleeve 210, and a portion of the internal gear 122 of the internal gear bracket 120 securely engages with a portion of the external gear 112 of the external gear bracket 110.

Subsequently, the passenger operates the operation knob or the operation button provided in the seat in order to adjust an angle of the seat back.

In this case, the shaft connected to the operation knob or the drive motor is rotated. Here, the shaft, which traverses the lower end portion of the seat back to be coupled to the recliner 100, is rotated in a clockwise or counterclockwise direction such that the seat back may be rotated in a forward or backward direction of the vehicle by the recliner 100.

Here, an example in which the shaft is rotated in the clockwise direction will be described.

When the shaft is rotated in the clockwise direction, the socket 150 which is spline-coupled to the shaft is rotated in the clockwise direction and the operation protrusion 153 of the socket 150 pushes one wedge block 220 of the pair of wedge blocks 220 to rotate the same in the clockwise direction. Consequently, the wedge block 220 pushed by the operation protrusion 153 presses and rotates the cam sleeve 210 while rotating in the clockwise direction.

Thus, when the wedge block 220 and the cam sleeve 210 are rotated in the clockwise direction, the external gear bracket is rotated in the counterclockwise direction while generating a rotation ratio by a difference of the number of teeth relative to the internal gear bracket 120.

The angle of the seat back is adjusted according to rotation of the external gear bracket 110.

As is apparent from the above description, a recliner for a vehicle seat according to the present invention may improve durability of each component by providing a lubrication pocket for receiving a lubricating substance in a socket and by constantly supplying the lubricating substance between a central protrusion of an internal gear bracket and an operation protrusion of the socket, between the operation protrusion of the socket and a bush, and between the bush and wedge blocks.

While the present invention has been described with respect to the specific embodiments, it will be apparent to those skilled in the art that various changes and modifications may be made without departing from the spirit and scope of the invention as defined in the following claims.

What is claimed is:

1. A recliner for a vehicle seat, comprising:
   an external gear bracket formed with a through-hole to which a bush is fitted and coupled, the external gear bracket having an external gear;
   an internal gear bracket which has an internal gear corresponding to the external gear and is formed with a central protrusion protruding toward the external gear bracket, the central protrusion having a fitting hole through which a shaft passes;
   a socket formed with a socket protrusion having a coupling hole through which the shaft is spline-coupled to the socket, the socket protrusion is formed toward the internal gear bracket, the socket having an operation protrusion which protrudes to surround a portion of an outer peripheral surface of the central protrusion; and
   a pair of wedge blocks configured to surround a portion of the outer peripheral surface of the central protrusion in a state in which one end portions of the wedge blocks face each other,
   wherein a first lubrication pocket is provided on an inner peripheral surface of the operation protrusion so as to supply a lubricating substance to the outer peripheral surface of the central protrusion.

2. The recliner according to claim 1, wherein the first lubrication pocket comprises a plurality of oil grooves spaced apart from each other at regular intervals on the inner peripheral surface of the operation protrusion.

3. The recliner according to claim 1, wherein a second lubrication pocket is provided on an outer peripheral surface of the operation protrusion so as to supply the lubricating substance to an inner peripheral surface of the bush.

4. The recliner according to claim 3, wherein the second lubrication pocket comprises a plurality of oil grooves spaced apart from each other at regular intervals on the outer peripheral surface of the operation protrusion.

5. The recliner according to claim 1, wherein a third lubrication pocket is provided on one side surface of the socket formed with the socket protrusion protruding therefrom so as to supply the lubricating substance to inner peripheral surfaces of the pair of wedge blocks.

6. The recliner according to claim 5, further comprising a cam sleeve disposed between the inner peripheral surfaces of the pair of wedge blocks and the outer peripheral surface of the central protrusion,
   wherein the third lubrication pocket comprises a plurality of oil grooves through which the lubricating substance is supplied between the inner peripheral surfaces of the pair of wedge blocks and the outer peripheral surface of the cam sleeve.

\* \* \* \* \*